June 21, 1927.  G. T. MORRIS  1,633,264
PET COCK AND PRIMING CUP CLEANER
Filed Dec. 2, 1925
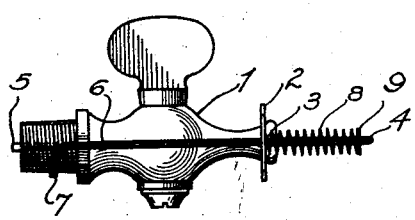
Fig-1-
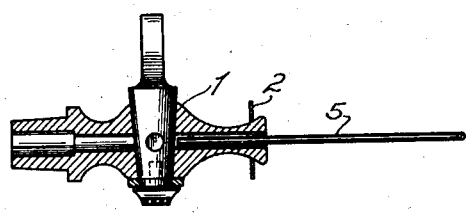
Fig-2-
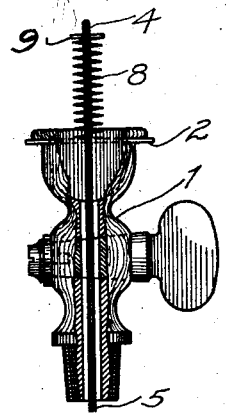
Fig-3-
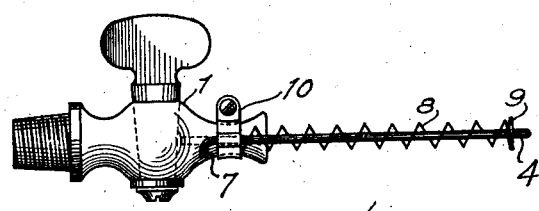
Fig-4-
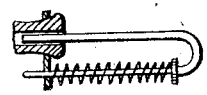
Fig-6-
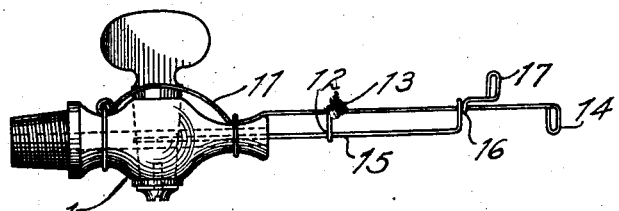
Fig-5-
Inventor
George T. Morris.
By Adam E. Fisher.
Attorney Patented June 21, 1927.

1,633,264

UNITED STATES PATENT OFFICE.

GEORGE T. MORRIS, OF MISSOULA, MONTANA.

PET-COCK AND PRIMING-CUP CLEANER.

Application filed December 2, 1925. Serial No. 72,627.

This invention relates to cleaning devices for pet or oil cocks and priming cup valves on automobiles.

The primary object of the invention is to provide a means whereby the pet cocks or priming cups may be readily cleaned of all sediment or carbon without removing the same, thereby eliminating the inconvenience of getting the hands full of dirt and grime.

Another object is to provide a simple and efficient cleaning device which may be readily incorporated in the pet cock or priming cup, or attached thereto at a comparatively small cost.

In the drawing

Figure 1 is a side elevation of a pet cock showing the invention incorporated therein;

Figure 2 is a sectional view of the pet cock shown in Figure 1;

Figure 3 is an elevation of a priming cup, partly in section, showing the invention incorporated therein;

Figures 4 and 5 are modified views showing the invention releasably attached to a pet cock.

Figure 6 is a detail of the U-shaped slide shown in Figure 1, part of the figure being shown in section.

This invention, which is carried out upon a pet cock or priming cup, may be incorporated in the said pet cock or priming cup, or releasably secured thereto.

As shown in Figures 1, 2 and 3, the invention is carried out by incorporating in the pet cock or priming cup 1 an ear 2 provided with a bearing 3. A U shaped slide 4 engages the interior of the pet cock or priming cup 1 with the side 5 for dislodging any sediment or carbon that may clog the same, and the bearing 3 with the side 6 for steadying the said slide 4. The said side 6 has its upper end formed into a stop 7 to prevent the said slide from being withdrawn. A spring 8 and a set collar 9 may be employed to partially withdraw the U shaped slide after cleaning the said pet cock or priming cup 1.

The operation of the device is apparent to those skilled in the art.

In the modified view shown in Figure 4, the bearing for carrying the slide 4 is releasably secured to the pet cock or priming cup 1 by means of a clamp 10.

In the modified view shown in Figure 5, a spring wire clamp 11 is provided. The clamp 11 extends outwardly from said pet cock 1 and in alignment therewith, and has formed on its free end a stop loop 14, and intermediate said free end a dependent guide 13 provided with a bearing 12. A plunger 15 formed with a bearing 16 and handle 17 is provided. The plunger 15 is slidably passed through the bearing 12 and adapted to engage the interior of the pet cock 1 while the bearing 16 is slidably engaged by the said free end of the clamp 11.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

In combination with a pet cock having a duct therethrough, a cleaning device of the kind described, comprising an ear mounted upon the end of the pet cock so as not to obstruct the mouth of the orifice thereof; a U-shaped cleaning element having one stem slidingly engaging the duct of the cock while an exterior stem is slidably supported by the said ear at the end of the cock, the extremity of the said exterior stem being formed into a stop adapted to engage the said ear; a set collar mounted upon the bight of the U-shaped element; and a coil spring encircling the exterior stem of the said U-shaped element between the said collar and the said ear and adapted normally to partially withdraw the U-shaped element from the pet cock.

In testimony whereof I affix my signature.

GEORGE T. MORRIS.